United States Patent [19]
Liljegren et al.

[11] Patent Number: 5,329,310
[45] Date of Patent: Jul. 12, 1994

[54] METHOD AND APPARATUS FOR CONTROLLING DISTORTION OF A PROJECTED IMAGE

[75] Inventors: Gordon E. Liljegren, Burbank; William G. Redmann, Simi Valley; Scott F. Watson, Glendale, all of Calif.

[73] Assignee: The Walt Disney Company, Burbank, Calif.

[21] Appl. No.: 907,108

[22] Filed: Jun. 30, 1992

[51] Int. Cl.$^5$ .............................................. H04N 7/18
[52] U.S. Cl. ................................... 348/147; 348/121; 348/143; 348/39; 348/46; 348/144
[58] Field of Search ................. 358/108, 104, 87, 209, 358/93; 382/44; 359/718, 728, 364, 363; 395/137–139; 434/43, 44, 40; H04N 7/18

[56] References Cited

U.S. PATENT DOCUMENTS

| | | | |
|---|---|---|---|
| 4,078,860 | 3/1978 | Globus et al. | 352/69 |
| 4,383,740 | 5/1983 | Bordousley | 358/104 |
| 4,656,521 | 4/1987 | Trzeciak et al. | 358/104 |
| 4,750,808 | 6/1988 | Nash et al. | 350/125 |
| 4,978,216 | 12/1990 | Liljegren et al. | 353/28 |
| 5,185,667 | 2/1993 | Zimmermann | 358/209 |

FOREIGN PATENT DOCUMENTS 0198630 10/1986 European Pat. Off. .
0421856  4/1991 European Pat. Off. .
4015048 11/1990 Fed. Rep. of Germany .

OTHER PUBLICATIONS

Dorsey, J., "Computer Graphics for the Design and Visualization of Opera Lighting Effects: A Thesis Presented to the Faculty of the Graduate School of Cornell University in Partial Fulfillment of the Requirements for the Degree of Master of Science," Jan. 1990.
Dorsey, J., "Design and Simulation of Opera Lighting and Projection Effects", *Computer Graphics*, vol. 25, No. 4, pp. 41–50 (ACM Siggraph, Jul. 1991).
Wolberg, G., *Digital Image Warping*, IEEE Computer Society Press Monograph, 1992.

*Primary Examiner*—James J. Groody
*Assistant Examiner*—Glenton B. Burgess
*Attorney, Agent, or Firm*—Laurence S. Rogers; Jeffrey H. Ingerman

[57] ABSTRACT

A method and apparatus for displaying an image that is subject to multiple distortions substantially without distortion is provided. The image is recorded from a first viewpoint and subject to a first distortion and played back from a second viewpoint and subject to a second distortion. The display surface may also be distorted (e.g., curved). By mapping back through the projector to the screen and through the camera (at the viewpoint), the image is transformed so that it can be viewed from the viewpoint with little or no distortion.

152 Claims, 6 Drawing Sheets

METHOD AND APPARATUS FOR CONTROLLING DISTORTION OF A PROJECTED IMAGE

BACKGROUND OF THE INVENTION

This invention relates to the projection of images with a controlled amount of distortion. More particularly, this invention relates to the projection of an image from a projection point that differs from the camera viewpoint from which it was recorded, to be viewed by a viewer from a viewer viewpoint substantially identical to the camera viewpoint.

In certain situations, it is desirable to project wide angle images in front of an audience onto a distorted— e.g., curved—screen. For example, in an amusement park "dark ride," a viewer or "guest," seated in a moving vehicle, is transported through a fantastic or magical world within a darkened or "light-controlled" building. An example of such a ride is a fun house, in which a guest seated in a car riding on track travels through sets depicting various vistas, such as a dungeon populated with various characters, followed by a cemetery from which ghosts are rising from the ground, and so forth. In such dark rides, viewers may be transported quickly past such scenes in limited space, yet the image sought to be presented to the viewer is one of a vast expanse, possibly stretching to the horizon or, in an outer space-type or other fantastic-type attraction, to infinity.

To achieve such an illusion, the scene to be presented to the user can be recorded (whether by filming photographically or electronically, or by animating, or by generating computer graphics) using a lens (a true optical lens in the case of photographic or electronic filming, or an applied distortion or transfer function in the case of animation or computer graphics) that transforms a wide view onto a small surface. One such lens in the optical domain might be a wide-angle or "fisheye" lens. The distorted image could then be played back through an appropriate projection lens, which may be the same or similar to the recording lens, onto a screen which may also be distorted. For example, to achieve the illusion of a vast expanse an appropriately curved screen might be used.

However, such techniques result in distortion to the viewer unless the various distortions can be cancelled out by each other or otherwise. One way to compensate for some of such distortions is to place the camera at the same point relative to the subject at which the viewer's eye will ultimately be relative to the image of the subject, moving it if necessary in the case of moving ride. However, in the case of a moving ride, or a moving image, it is not possible to place the projector at that point unless the projector is also allowed to move. Arranging for such movement, such as placing the projector on the ride vehicle, is complex and expensive, requiring, at the very least, a separate projector for each vehicle. Placing the projector on the vehicle subjects the projector to possible vibration-induced damage, and at the same time increases the difficulty of access for maintenance purposes. Even if the viewers remain stationary, the projector might have to be placed on a different axis to avoid casting shadows of the viewers or their chairs on the screen.

Similar considerations arise in the case of a simulator-type ride where the viewer is supposed to believe he is looking out to infinity (or at least to the horizon). If the distortions are not corrected for, the viewer will realize that the screen is a finite (and small) distance away. The option of placing the projector on the simulator platform is even less attractive than that of placing it on a moving ride vehicle because it is subject to even more violent motion, in addition to the other reasons noted above.

There are known techniques for dealing with distortions induced by recording of images. However, such techniques are incapable of dealing with situations in which different distortions of the image are applied at different points in the system—e.g., at the camera, at the screen and at the projector—and at the same time dealing with a sequential series of images representing motion.

Accordingly, it would be desirable to be able to project an image, taken from a particular point of view, onto a screen, especially a curved wide angle screen, from a different point of view, to be viewed from the original point of view, without distortion.

SUMMARY OF THE INVENTION

It is an object of this invention to be able to project an image, taken from a particular point of view, onto a screen, especially a curved wide angle screen, from a different point of view, to be viewed from the original point of view, without distortion.

In accordance with this invention, there is provided a method of displaying an image of a subject on a display surface having a display surface shape and a display surface position, for observation from a viewpoint having a viewpoint position at which said display surface subtends a first field of view, with the displayed image having a controlled amount of distortion. The method includes the steps of recording source image visual data for the image by transforming source visual data of the subject through a first distorting transformation with respect to a recording point at which the subject subtends a second field of view which is at least partially contained within the first field of view at the recording point. Next the recorded source image visual data is transformed through an intermediate transformation to produce target image visual data. Then the target image visual data is played back from a playback point having a playback point position at which the display surface subtends a third field of view and such that the subject image subtends at the viewpoint a fourth field of view at least partially contained within the first field of view at the viewpoint, through a second distorting transformation. The first and second distorting transformations, and the digital transformation, are selected so that the second and fourth fields of view are substantially identical, causing a controlled amount of distortion, which preferably is the absence of distortion.

Apparatus for performing the method is also provided. Further, the method can be carried out repeatedly, and apparatus for doing so can be provided, to allow the projection of the repeated frames of a moving image.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Generally speaking, the present invention allows one to record an image of a certain subject field of view of a recording device, with distortion if necessary or desired in the recording device, and then project the recorded image, again with distortion if necessary or desired, onto any shaped screen in front of a viewer, and present the same image to the viewer in the viewer's field of view, with no distortion, or with some controlled amount of distortion. This result is achieved by use of an intermediate transformation of the recorded image based on the distortion introduced by the recording device, if any, the distortion at the projector, if any, and the position of the camera with respect to the subject and the position of the projector with respect to the screen, based on the assumption that the position of the camera with respect to the subject will be substantially the same as that of the viewer with respect to the image of the subject on the screen. As used herein, the position of a camera or projector refers to the location of the forward nodal point of its lens system. In the case of a computer-generated image, camera or projector position refers to the center of projection.

In the case of a ride vehicle or platform that will carry several guests, a viewpoint at about the center of the vehicle or platform is used. Such a viewpoint is not exactly correct for any one viewer, but is sufficiently close for all viewers.

It is to be understood that the recording device may be a camera that records in either the photographic or electronic (e.g., video) domain, or may be a computer graphics generator. Animation techniques such as rotoscope, perspective drawing, character animation, etc., can also be used in place of the recording device. Similarly, the projector may be a real photographic or video projector, or may be a virtual projector in a computer graphics production in which case the image to be "projected" would be further processed to introduce additional graphic effects. The "distortion" referred to above at both the camera and the projector is generally defined by the respective lens transfer functions of those devices. Of course, the "lens" transfer functions may represent transfers accomplished by other than traditional optical lenses.

Knowing the positions and lens transfer functions of the camera and projector, as well as the position and shape of the screen, allows one to determine the intersection with the screen of a light ray originating at any pixel on the film plane of the camera or projector. The ability to determine such intersections allows one to perform the transformation according to the invention. As used herein in connection with film images (as opposed to video or computer graphic images) "pixel" means a coordinate on the film plane circumscribed by, or falling on, an appropriately-shaped (e.g., rectangular) perimeter, defining an area of the film plane.

Specifically, to construct the projector "film" (which may not be real photographic film, as discussed above), for each frame one maps each pixel on the projector film plane through the projector lens transfer function onto a point on the screen. One then maps that point on the screen back through the camera lens transfer function onto a pixel on the camera film plane. One then takes the image data from that pixel in the camera film plane and uses it to fill the original pixel in the projector film plane. Having done that for all projector pixels, when the projector film is projected on the screen, a viewer at a point having the same field of view as the camera will see a substantially undistorted view of the image recorded by the camera. The correct result is produced regardless of the shape of the screen.

The process just described for one frame can be serially performed for a plurality of sequential frames in a moving picture. Such a moving picture can include one where the camera was also in motion, so that a viewer following the same motion path on a ride vehicle or platform will see an undistorted moving picture.

The process also allows different numbers of camera, screens and projectors, although in the case of multiple cameras, all of the cameras should preferably have the same viewpoint, which will correspond to the viewpoint of the ultimate viewer. The invention will still map any one projector pixel onto only one point on one of the screens, and that screen point will usually map back to only one camera, allowing one to fill the projector pixel, which is the desired result to produce a viewable image. If more than one camera pixel is mapped, an appropriate formula can be used to determine which should be used to fill the projector pixel, or how to combine the respective contributions.

It may be that a given projector pixel does not map precisely onto a single camera pixel, but rather that the mapping overlaps the intersection of a group of pixels, in which case an appropriate formula can be devised to combine the contributions from the different camera pixels. Similarly, rather than mapping pixels, the corners of each pixel could be mapped, and the contents of the area of the camera film plane bounded by the mapped corners (which may not be rectangular) can be used to fill the projector pixel. One group of such techniques for determining the coordinate of the pixel could be those techniques known in the art as anti-aliasing techniques.

Mapping projector pixels back to the camera film plane, as just described, usually assures that image data for the projector pixel will be found in the camera film plane. It is also possible to map camera pixels to the projector film plane. However, the nature of the transfer functions may be such that multiple camera pixels map to a single projector pixel, while other projector pixels are not mapped onto at all, resulting in a sparsely populated matrix of filled projector pixels, which must then be fully populated by interpolation or other techniques.

As used herein, the term "field of view" refers to a segment of solid angle having a viewpoint as its vertex.

Two fields of view are defined as being identical, or substantially identical, when they encompass the same or substantially the same solid angle, when considered relative to their respective vertices. One such coordinate system is the one defined by the locations of a screen and a point from which the screen is viewed. This concept may be better understood, along with the invention as a whole, by reference to FIGS. 1-3.

Figure 1:
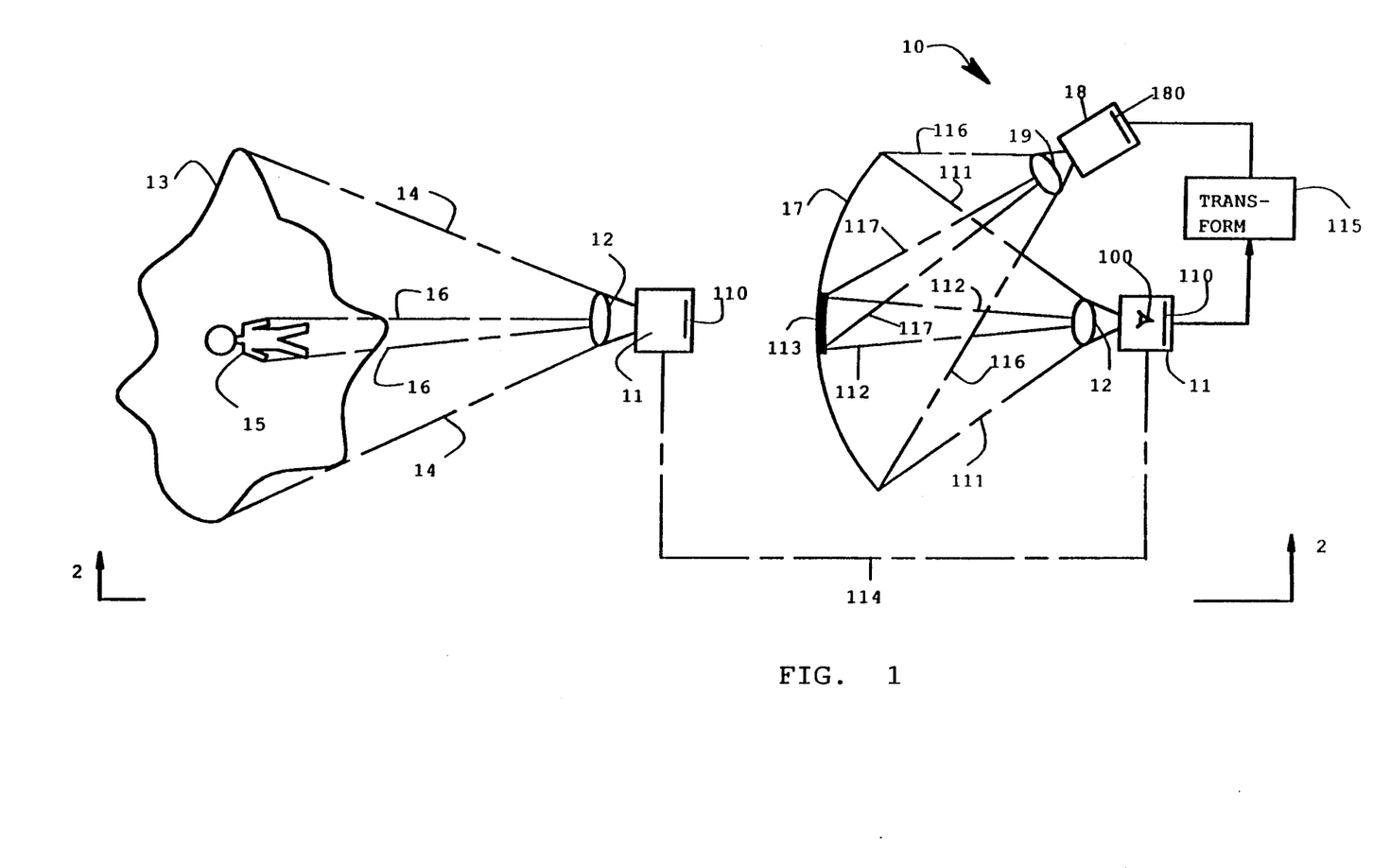
FIG. 1 is a schematic plan view of a preferred embodiment of a simulator system according to the present invention.
Figure 2:
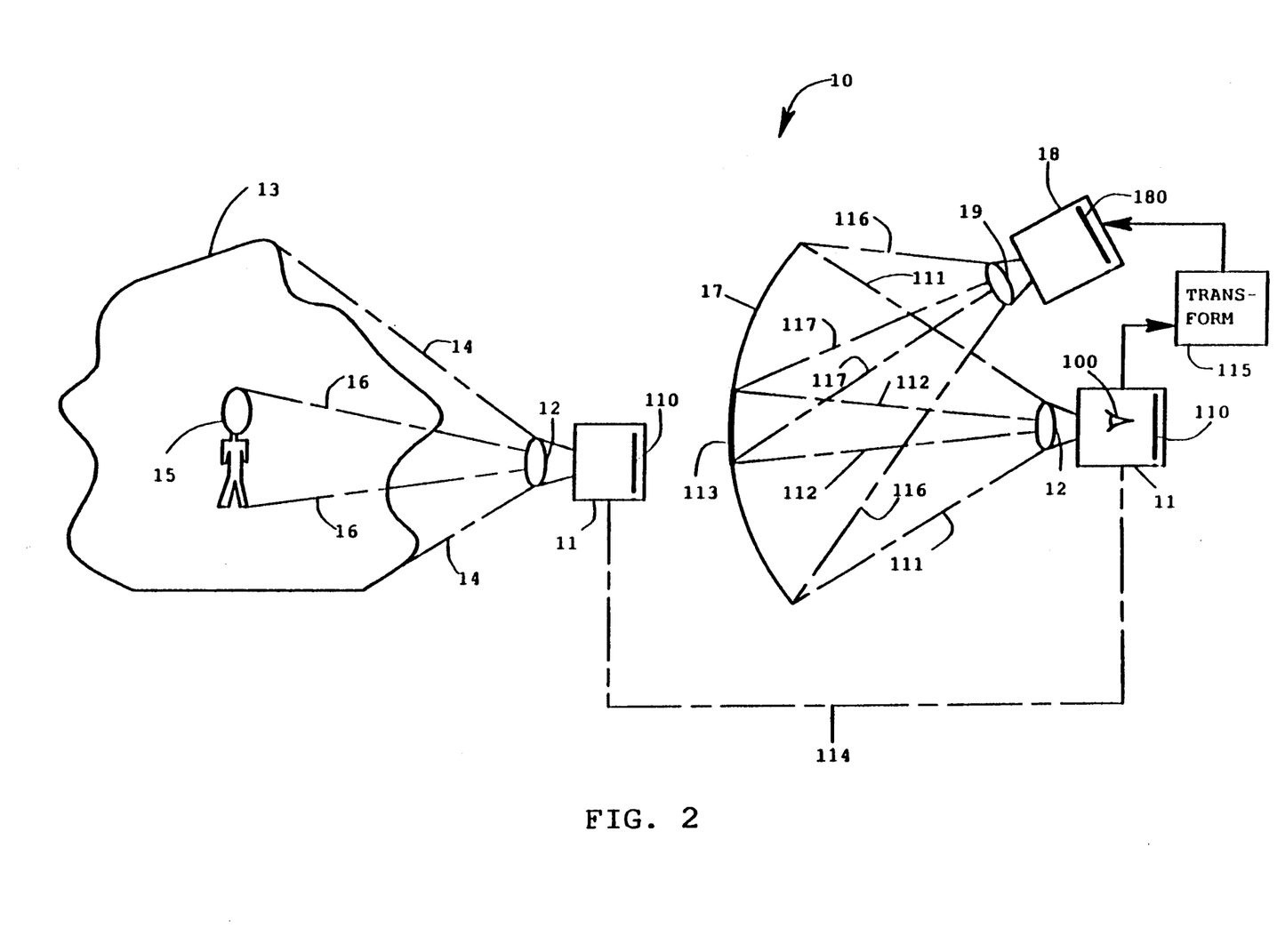
FIG. 2 is a schematic side elevational view of the simulator system of FIG. 1 taken from line 2—2 of FIG. 1.

System 10 of FIGS. 1 and 2 schematically represents a first preferred embodiment of a system in accordance with the present invention. In system 10, a camera 11 having a film plane 110 and having a distortion transfer function represented by lens 12, is used to photograph a scene 13, within a field of view 14. Scene 13 includes subject 15 within field of view 16, which is wholly within field of view 14.

The images captured by camera 11 are intended to be projected onto a screen 17 by a projector 18, having a film plane 180 and a distortion transfer function represented by lens 19, for viewing by a viewer 100. Screen 17 is preferably toroidal, as evidenced by the different curvatures visible in the plan and elevational views, or a similar surface constructed to minimize cross reflections and to concentrate the reflected light from the projector toward the viewer.

It would generally be desired that the viewer's field of view 111 subtended by screen 17 be substantially identical to camera field of view 14 at the time that scene 13 is captured, even though scene 13 may be any distance with respect to camera 11 while screen 17 is only a few feet from viewer 100, and even though projector 18 is at a different position and has a different field of view 116. However, there can also be cases in which only the field of view 112 subtended by image 113 of subject 15, corresponding to field of view 117 of projector 18, is desired to be substantially identical to camera field of view 16 which is wholly within camera field of view 14. For example, when subject 15 is filmed, it may be intended that his image will be replayed over a background created and captured elsewhere. Generally it is desired that some subset of the full camera field of view subtended by a subject, which subset may be the full camera field of view, should be substantially identical to some subset of the full viewer's field of view subtended by the image of the subject, which subset may be the full viewer's field of view.

It may also be that the viewer's field of view 112 subtended by image 113 ("subject field of view") may only partially fall into the viewer's full field of view 111 ("full field of view"), with the remainder of the subject field of view projecting beyond the edge of the full field of view. That would be acceptable as long as the portion lost beyond the edge is not considered important.

The result according to the invention is achieved by computationally superimposing camera 11, as at 114, onto the location of viewer 100 and then performing at 115 the transformation described above, and also described below in connection with FIGS. 4-6. It should be noted that the representation of camera 11 in FIG. 1 at viewpoint 100 is not intended to represent an actual camera at that location. Rather, it indicates that when scene 13 is recorded by camera 11, the camera is positioned so that its field of view is substantially identical to that of the ultimate viewer.

Transformation 115 can be performed optically or by some other analog method, but in the most preferred embodiment is performed digitally in a computer graphics generator such as an IRIS-4D ™ Indigo ™ workstation manufactured by Silicon Graphics, Inc., of Mountain View, Calif., although any other graphics generator, or even a properly programmed general purpose digital computer, could be used to perform the digital transformation.

Figure 3:
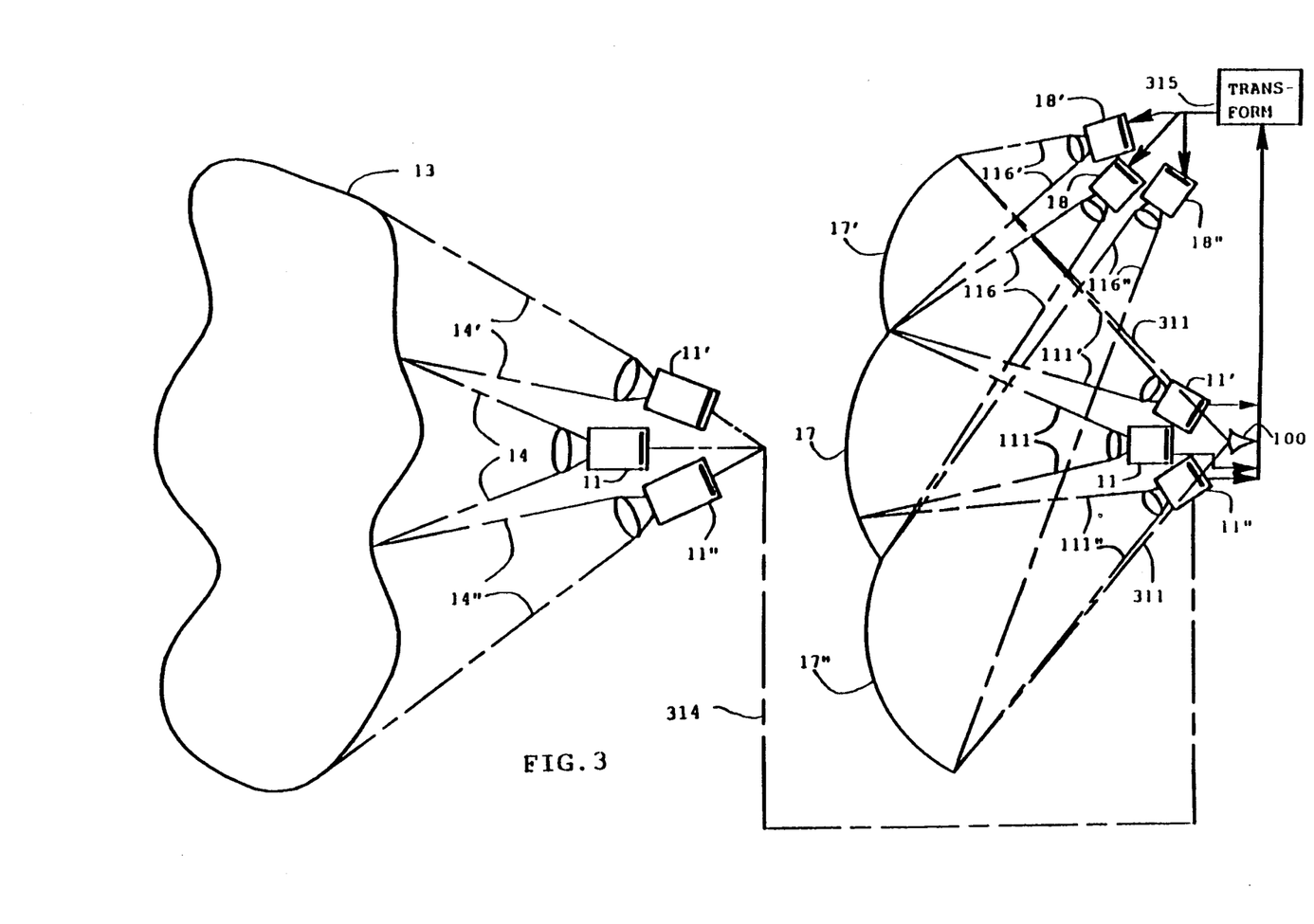
FIG. 3 is a schematic plan view of a simulator system similar to that of FIGS. 1 and 2, but having multiple projectors, multiple screens and multiple cameras.

FIG. 3 shows a schematic representation of a system according to the invention having multiple projectors, screens and cameras. Despite the presence of multiple ones of each of cameras 11, 11', 11" screens 17, 17' and 17" and projectors 18, 18' and 18", it can be seen from FIG. 3, where cameras 11, 11' and 11" are computationally superimposed at 314 adjacent viewer 100 (as in the case of FIG. 1, this does not represent the actual locations of the cameras), and are transformed at 315 to projectors 18, 18' and 18" for projection onto screens 17, 17' and 17" that there need not be a one-to-one correspondence between the various cameras, projectors, and screens, so that the numbers of each need not be identical. For example, each screen 17, 17' and 17" is filled by respective field of view 116, 116' and 116" of respective projector 18, 18' and 18", but screen 17 falls partly in field of view 111 of camera 11 and partly in field of view 111" of camera 11". Screen 17" fills the remainder of field of view 111", while screen 17' fills field of view 111' of camera 11'. As shown by the splitting of screen 17 between two cameras 11, 11", a one-to-one correspondence is not necessary as long as the final result is that viewer 100 sees the proper images in his field of view 311. This can be achieved by mapping projector film plane pixels back to camera film plane pixels as above. In most cases, there will only be one source pixel, but if there are two—e.g., where any two or more of camera fields of view 14, 14', 14" physically overlap—their contributions can be combined or rules for selecting among them can be provided.

An important constraint in a multiple camera embodiment is that preferably all cameras have a single nodal point, which can be achieved using mirrors or beam splitters. It should be noted that FIG. 3 is a schematic representation only and not show all cameras having a single nodal point. However, in the case of an embodiment where cameras 11, 11', 11" are physical cameras, those cameras in fact have optically superimposed nodal points. And in the case of an embodiment where cameras 11, 11', 11" represent logical or virtual cameras (e.g., in a computer graphics embodiment), then those cameras share the same center of projection.

Figure 4:
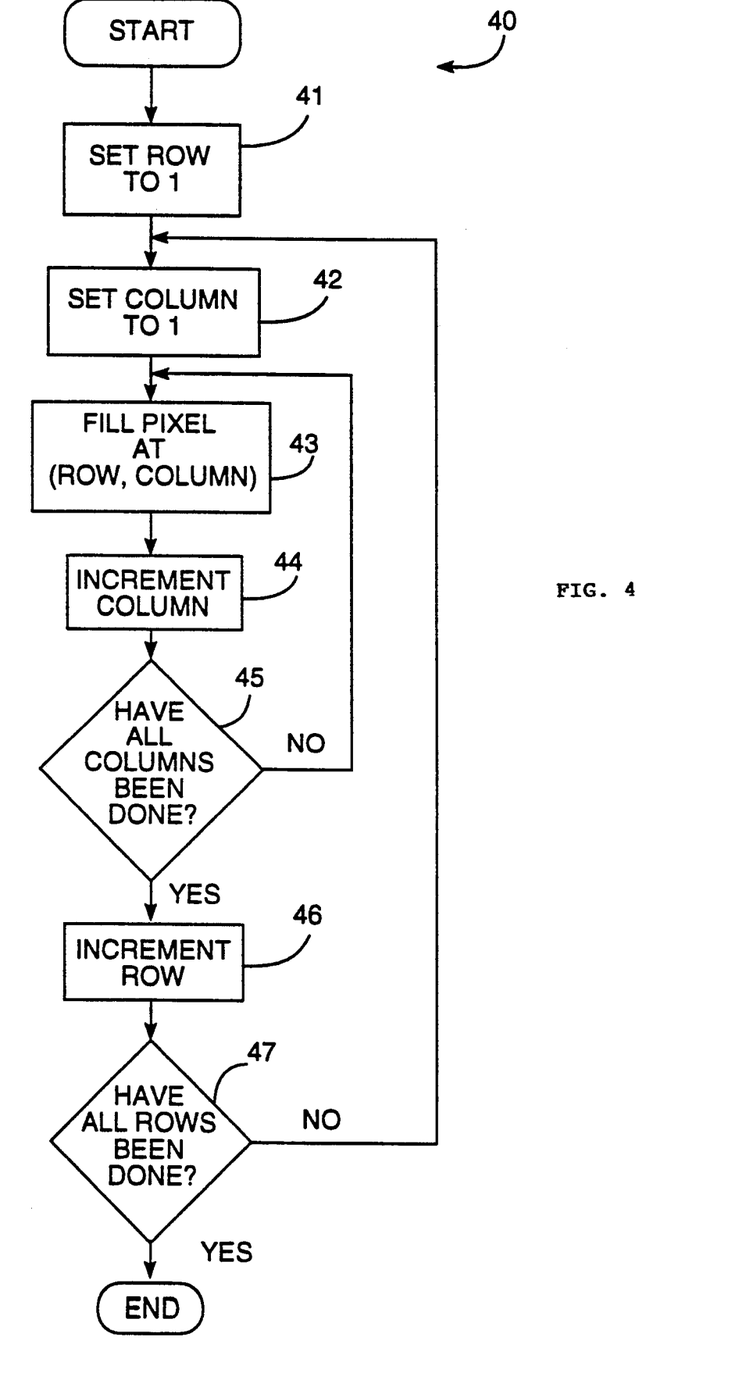
FIG. 4 is a flow diagram of a preferred embodiment of the method of this invention for a single-projector system according to the invention.

For a single projector system according to this invention, the computational steps for transforming an image in accordance with the present invention are diagrammed in FIG. 4. The transformation can also be performed optically in some cases, but in the preferred embodiment it is performed digitally as set forth above. The computational method diagrammed in FIG. 4 can be programmed in any suitable computer language, and in the preferred embodiment is implemented in the C++ language.

Process 40 begins at step 41 where, for a target frame at projector film plane 180, having rows and columns of pixels, the row to be filled is initialized to 1. The system than proceeds to step 42 where, for a given row, the column is initialized to 1. Next, at step 43, explained in more detail below, the pixel at a given row and column is filled with source image data from camera 11. At step 44 the system increments the column and at test 45 it determines whether all columns have been done (is the value of the column variable greater than the number of columns?). If all columns have not been done, the system returns to step 43 to fill the next pixel. Otherwise, if at test 45 all columns have been done, then the system proceeds to step 46 where it increments the row. At test 47 the system determines whether all rows have been done. If not, the system returns to step 42 where it processes the next row of pixels. If at test 47 all rows have been done, the process ends.

Figure 5:
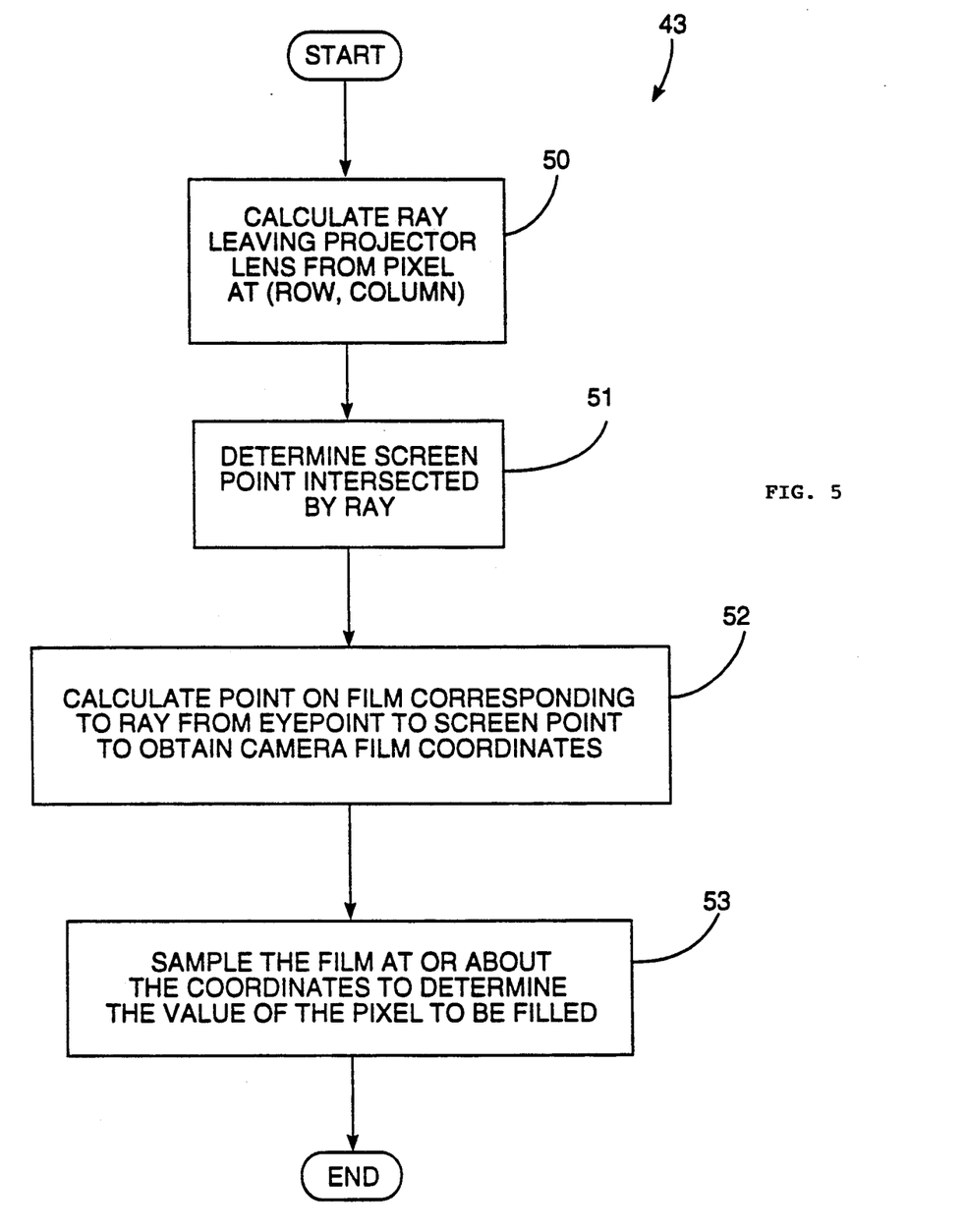
FIG. 5 is a flow diagram of a preferred embodiment of the pixel filling step of the method diagrammed in FIG. 4.

Step 43 of process 40, in which individual target pixels at the projector are filled, is diagrammed in more detail in FIG. 5. At step 50, the mathematical equation for a ray leaving the projector lens from the target pixel is calculated. This is achieved in a fairly straightforward way using the lens transfer function, as known to those skilled in the art. The transfer functions of most lenses can be modelled fairly well, for example, as quadratic or cubic expressions. These functions are frequently expressed in polar coordinates, in which case the pixel row and column coordinates would be transformed, for example, into azimuth and elevation coordinates.

At step 51, the intersection point between the ray determined in step 50 and the screen is calculated. This is done by simultaneously solving the equation for the ray and that for the screen. The equation for the screen is known because the shape is known. If the screen is planar, there may be only one real solution. If the screen is curved—e.g., spherical or toroidal—there may be more than one real solution, and the one closest to the projector in the direction of the ray is used, because light rays from the projector will not pass beyond that point. If the shape of the screen is sufficiently arbitrary, it may not be possible to define it by a mathematical expression, and in that case a table of coordinates occupied by the screen is used, and points along the relevant ray are tested against that table to determine the intersection point. If no screen coordinate is seen by a particular pixel from the projector, then when step 51 is performed for that screen coordinate and that pixel, there will be no source image data, and thus no film point contribution will be calculated, which is as it should be.

The system of the invention can be used with front or rear projection. Therefore, it is also advantageous to define a normal direction of the screen surface and to use only screen intersection points on the correct side of the screen in performing the transformation.

Next, at step 52, coordinates of a point on the camera film are determined from the transfer function of the camera lens—which usually can also be modelled as a quadratic or cubic expression—and the coordinates of the intersection point on the screen, in a conventional and well-known manner. This will be the point on the camera film that would "see" the intersection point on the screen.

Finally, at step 53, the data at or about the camera film point are sampled and used to fill the target pixel at the projector. As set forth above, the target pixel may not map precisely onto a source pixel, and contributions from a number of partial pixels may have to be used.

Figure 6:
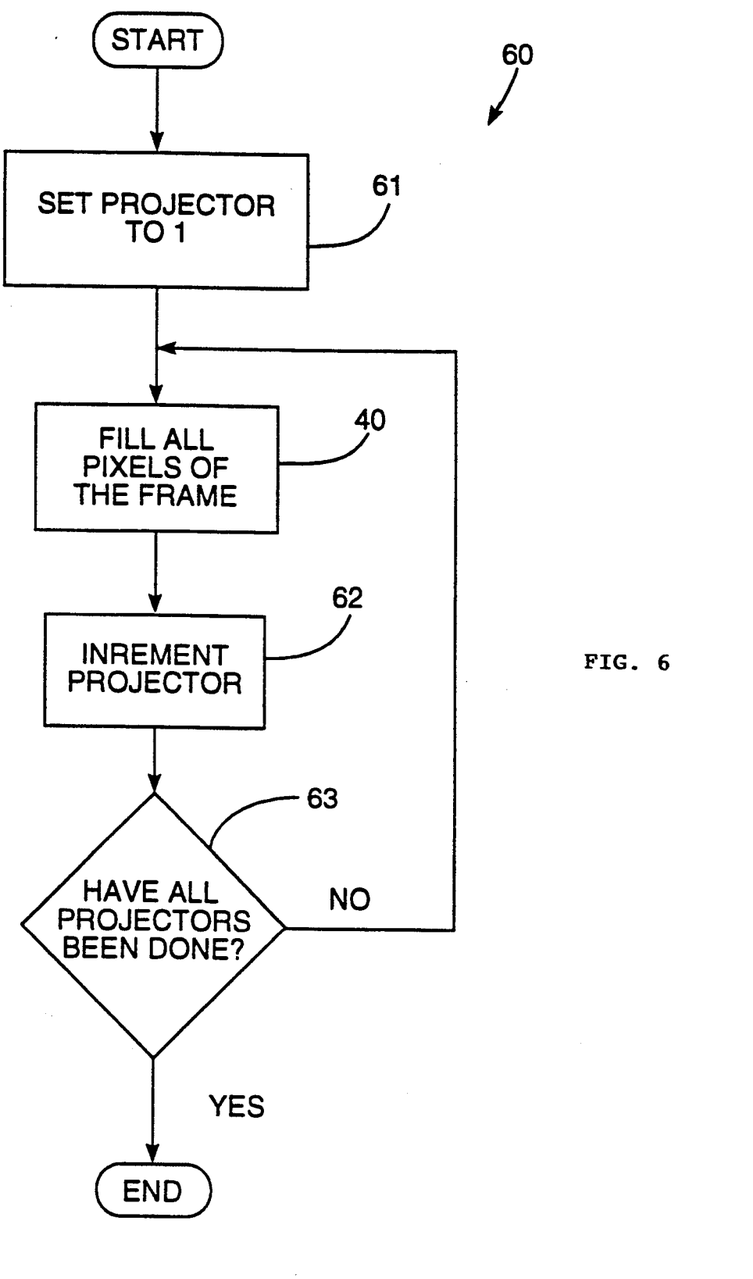
FIG. 6 is a flow diagram of a preferred embodiment of the method of this invention for a multiple-projector system according to the invention.

FIG. 6 shows a generalization 60 of process 40 of FIG. 4 for a multiple projector embodiment. Process 60 begins at step 61 where the projector number is initialized to 1. The system then performs process 40 for all pixels of the frame in the current projector corresponding to the current image. Next, at step 62, the system increments the projector number, and it then tests at test 63 to see if all projectors have been done. If not, then process 40 is repeated for the now-current projector. If at test 63 all projectors have been done, then for each projector a frame for the current image has been transformed and the process ends.

Similar generalizations can be used for embodiments having multiple screens or cameras. For example, for multiple screens, then in step 51 of step 43 of process 40, multiple screen intersect points will be determined, from which a single point is selected as previously described. One skilled in the art will recognize that similar calculations can be performed for a multiple camera embodiment, which might be used, for example, to integrate into a wide-angle image a high-resolution inset taken by a second camera in extreme close-up format. In such a process, the source image data from the inset camera preferably would be selected in preference to source image data from the wide-angle camera.

Further, the display surface can be an active addressable array of video elements, such as an active matrix liquid crystal display, an electroluminescent panel or a large scale video display such as the JTS-80V JUMBOTRON display available from Sony Corporation, of Tokyo, Japan, which has a large number of cathode ray tube displays, each of which displays a single pixel of an image. In that case, each pixel can be considered to be the combination of a virtual projector, a single virtual ray emanating therefrom, and a screen intersect point. Each such pixel can thus be treated as both a projector and a screen in a multiple projector/multiple screen embodiment, and for each pixel, the playback point is immediately adjacent the pixel, and the field of view at the playback point encompasses the entire pixel.

The display surface can also be a "video wall"—i.e., an array of cathode ray tubes each displaying part of the entire image. A video wall can be treated as a multiple projector/multiple screen embodiment where each cathode ray tube is a projector/rear screen projection display pair.

As heretofore described, the system of the invention can be used to transform a single frame, or scene, for presentation to the viewer. Of course, if multiple scenes are to be presented, the process is repeated for each frame, taking into account any change in the relative positions of the projector, camera and screen, as well as screen shape, as might result if a moving image is being presented or the camera was moved during capture of the image to duplicate eventual motion of the ride vehicle or platform during playback. This has the effect of recomputing the transform necessary to remove distortion each time the viewer moves. If a series of images is to be presented but the projector, the screen and the viewer are static relative to one another, it is of course possible to repeat the process for each image if desired, but it is also possible to perform the transformation calculation only for the pixels of the first image and then load a lookup table (not shown) with the mapping of camera pixels onto projector pixels. That lookup table can then be used for each image or frame to determine which pixel in the camera film plane should be used to fill a particular pixel in the projector film plane, in place of using steps 50, 51, 52. It will be apparent that other optimizations can be performed where any two of the projector, screen and viewer are static.

Thus it is seen that a system and method for projecting an image, taken from a particular point of view, onto a screen, especially a curved wide angle screen, from a different point of view, to be viewed from the original point of view, without distortion has been provided. One skilled in the art will appreciate that the present invention can be practiced by other than the described embodiments, which are presented for purposes of illustration and not of limitation, and the present invention is limited only by the claims which follow.

What is claimed is:

1. A method of displaying an image of a subject on a display surface having a display surface shape and a display surface position, for observation from a viewpoint having a viewpoint position at which said display surface subtends a first field of view, said displayed image having a controlled amount of distortion, said method comprising the steps of:
    recording source image visual data for said image by transforming source visual data of said subject through a first distorting transformation process with respect to a recording point at which said subject subtends a second field of view which is at least partially contained within said first field of view at said recording point;
    transforming said recorded source image visual data through an intermediate transformation process to produce target image visual data; and
    playing back said target image visual data from a playback point having a playback point position at which said display surface subtends a third field of view and such that said subject image subtends at said viewpoint a fourth field of view at least partially contained within said first field of view of said viewpoint, through a second distorting transformation process; wherein:
    said first and second distorting transformation processes, and said intermediate transformation process are selected so that said second and fourth fields of view are substantially identical, thereby causing said controlled amount of distortion.

2. The method of claim 1 wherein said recording step comprises generating digital image visual data.

3. The method of claim 1 wherein said recording step comprises capturing live image visual data.

4. The method of claim 3 wherein said capturing step comprises capturing said live image visual data on a photographic medium.

5. The method of claim 3 wherein said capturing step comprises capturing said live image visual data in electronic form.

6. The method of claim 5 wherein said capturing step comprises capturing said live image visual data in a video format.

7. The method of claim 3 wherein said capturing step comprises capturing said image as a number of captured image segments, each of said captured image segments being captured from said recording point, said captured image segments together subtending said second field of view at said recording point.

8. The method of claim 1 wherein said playing back step comprises playing said recorded image visual data back on a nonplanar display surface, said nonplanar display surface contributing also to said controlled amount of distortion.

9. The method of claim 1 wherein said controlled amount of distortion is the absence of distortion.

10. The method of claim 1 wherein:
    said intermediate transformation process is a digital transformation process; said method further comprising the step of:
    digitizing said source image visual data for use in said digital transformation process.

11. The method of claim 10 wherein said digital transformation process comprises, for each target pixel of said target image visual data:
    determining first from said second distorting transformation process, said playback point position, said display surface position and said display surface shape, a location on said display surface onto which said target pixel would be projected;
    determining second from said first distorting transformation process, said viewpoint position, said display surface position and said display surface shape, a source pixel in said source image visual data which corresponds to said location on said display surface; and
    filling said target pixel with image data from said source pixel.

12. The method of claim 11 wherein:
    at least one of said first and second determining steps is performed for each target pixel in said target image visual data before said filling step is performed for any target pixel;
    results of at least one of said first and second determining steps for each target pixel are used to produce a table of correspondence between source and target pixels; and
    said filling step comprises, for each target pixel, looking up a corresponding source pixel in said table.

13. The method of claim 1 wherein said playing back step comprises playing back said target image visual data in electronic form.

14. The method of claim 13 wherein said playing back step comprises projecting said target image visual data onto said display surface in a video format.

15. The method of claim 14 wherein said viewpoint is on a first side of said display surface; and
    said projecting step comprising projecting said target image visual data onto said first side of said display surface.

16. The method of claim 14 wherein:
    said viewpoint is on a first side of said display surface; and
    said projecting step comprises projecting said target image visual data onto a second side of said display surface opposite said first side.

17. The method of claim 1 wherein said playing back step comprises playing back said target image visual data photographically.

18. The method of claim 17 wherein said playing back step comprises projecting said target image visual data onto said display surface photographically.

19. The method of claim 18 wherein:
    said viewpoint is on a first side of said display surface; and
    said projecting step comprises projecting said target image visual data onto said first side of said display surface.

20. The method of claim 18 wherein:
    said viewpoint is on a first side of said display surface; and
    said projecting step comprises projecting said target image visual data onto a second side of said display surface opposite said first side.

21. The method of claim 1 wherein said image is displayed on a number of display surfaces which together subtend said first field of view at said viewpoint.

22. The method of claim 21 wherein said playing back step comprises playing back said target image visual data as a number of playback image segments which together subtend said third field of view at said playback point.

23. The method of claim 22 wherein said number of display surfaces is equal to said number of playback image segments.

24. The method of claim 22 wherein said number of display surfaces is different from said number of playback image segments.

25. The method of claim 1 wherein said playing back step comprises playing back said target image visual data as a number of playback image segments which together subtend said third field of view at said playback point.

26. The method of claim 25 wherein said recording step comprises capturing said image as a number of captured image segments, each of said captured image segments being captured from said recording point, said captured image segments together subtending said second field of view at said recording point.

27. The method of claim 26 wherein said number of captured image segments is equal to said number of playback image segments.

28. The method of claim 26 wherein said number of captured image segments is different from said number of playback image segments.

29. The method of claim 1 wherein said recording step comprises capturing said image as a number of captured image segments, each of said captured image segments being captured from said recording point, said captured image segments together subtending said second field of view at said recording point.

30. The method of claim 29 wherein said image is displayed on a number of display surfaces which together subtend said first field of view at said viewpoint.

31. The method of claim 30 wherein said number of captured image segments is equal to said number of display surfaces.

32. The method of claim 30 wherein said number of captured image segments is different from said number of display surfaces.

33. The method of claim 30 wherein said playing back step comprises playing back said target image visual data as a number of playback image segments which together subtend said third field of view at said playback point.

34. The method of claim 33 wherein said number of captured image segments, said number of playback image segments, and said number of display surfaces are all equal.

35. The method of claim 33 wherein said number of captured image segments, said number of playback image segments, and said number of display surfaces are unequal.

36. The method of claim 35 wherein any two of said number of captured image segments, said number of playback image segments, and said number of display surfaces are equal.

37. Apparatus for displaying an image of a subject on a display surface having a display surface shape and a display surface position, for observation from a viewpoint having a viewpoint position at which said display surface subtends a first field of view, said displayed image having a controlled amount of distortion, said apparatus comprising:

means for recording source image visual data for said image including means for transforming source visual data of said subject through a first distorting transformation process with respect to a recording point at which said subject subtends a second field of view which is at least partially contained within said first field of view at said recording point;

intermediate transforming means for transforming said recorded source image visual data through an intermediate transformation process to produce target image visual data; and means for playing back said target image visual data from a playback point having a playback point position at which said display surface subtends a third field of view and such that said subject image subtends at said viewpoint a fourth field of view at least partially contained within said first field of view at said viewpoint, through a second distorting transformation process; wherein:

said first and second distorting transformation processes, and said intermediate transformation process are selected so that said second and fourth fields of view are substantially identical, thereby causing said controlled amount of distortion.

38. The apparatus of claim 37 wherein said recording means comprises means for generating digital image visual data.

39. The apparatus of claim 37 wherein said recording means comprises means for capturing live image visual data.

40. The apparatus of claim 39 wherein said capturing means captures said live image visual data on a photographic medium.

41. The apparatus of claim 39 wherein said capturing means captures said live image visual data in electronic form.

42. The apparatus of claim 41 wherein said capturing means captures said live image visual data in a video format.

43. The apparatus of claim 39 wherein said capturing means captures said image as a number of captured image segments, each of said captured image segments being captured from said recording point, said captured image segments together subtending said second field of view at said recording point.

44. The apparatus of claim 37 wherein said playing back means plays said recorded image visual data back on a nonplanar display surface, said nonplanar display surface contributing also to said controlled amount of distortion.

45. The apparatus of claim 37 wherein said controlled amount of distortion is the absence of distortion.

46. The apparatus of claim 37 wherein:

said intermediate transforming means comprises digital transforming means; said apparatus further comprising:

means for digitizing said source image visual data for use in said digital transforming means.

47. The apparatus of claim 46 wherein said digital transforming means comprises, for each target pixel of said target image visual data:

first determining means for determining from said second distorting transformation process, said playback point position, said display surface position and said display surface shape, a location on said display surface onto which said target pixel would be projected;

second determining means for determining from said first distorting transformation process, said viewpoint position, said display surface position and said display surface shape, a source pixel in said source image visual data which corresponds to said location on said display surface; and means for filling said target pixel with image data from said source pixel.

48. The apparatus of claim 47 wherein:

at least one of said first and second determining means operates on each target pixel in said target image visual data before said filling means operates for any target pixel;

output of at least one of said first and second determining means for each target pixel is used to produce a table of correspondence between source and target pixels; and for each target pixel, said filling means look up a corresponding source pixel in said table.

49. The apparatus of claim 37 wherein said playing back means plays back said target image visual data in electronic form.

50. The apparatus of claim 49 wherein said playing back means projects said target image visual data onto said display surface in a video format.

51. The apparatus of claim 50 wherein said viewpoint is on a first side of said display surface; and said projecting means projects said target image visual data onto said first side of said display surface.

52. The apparatus of claim 50 wherein said viewpoint is on a first side of said display surface; and said projecting means projects said target image visual data onto a second side of said display surface opposite said first side.

53. The apparatus of claim 37 wherein said playing back means plays back said target image visual data photographically.

54. The apparatus of claim 53 wherein said playing back means projects said target image visual data onto said display surface photographically.

55. The apparatus of claim 54 wherein said viewpoint is on a first side of said display surface; and said projecting means projects said target image visual data onto said first side of said display surface.

56. The apparatus of claim 54 wherein said viewpoint is on a first side of said display surface; and said projecting means projects said target image visual data onto a second side of said display surface opposite said first side.

57. The apparatus of claim 37 wherein said image is displayed on a number of display surfaces which together subtend said first field of view at said viewpoint.

58. The apparatus of claim 57 wherein said playing back means plays back said target image visual data as a number of playback image segments which together subtend said third field of view at said playback point.

59. The apparatus of claim 58 wherein said number of display surfaces is equal to said number of playback image segments.

60. The apparatus of claim 58 wherein said number of display surfaces is different from said number of playback image segments.

61. The apparatus of claim 37 wherein said playing back means plays back said target image visual data as a number of playback image segments which together subtend said third field of view at said playback point.

62. The apparatus of claim 61 wherein said recording means captures said image as a number of captured image segments, each of said captured image segments being captured from said recording point, said captured image segments together subtending said second field of view at said recording point.

63. The apparatus of claim 62 wherein said number of captured image segments is equal to said number of playback image segments.

64. The apparatus of claim 62 wherein said number of captured image segments is different from said number of playback image segments.

65. The apparatus of claim 37 wherein said recording means captures said image as a number of captured image segments, each of said captured image segments being captured from said recording point, said captured image segments together subtending said second field of view at said recording point.

66. The apparatus of claim 65 wherein said image is displayed on a number of display surfaces which together subtend said first field of view at said viewpoint.

67. The apparatus of claim 66 wherein said number of captured image segments is equal to said number of display surfaces.

68. The apparatus of claim 66 wherein said number of captured image segments is different from said number of display surfaces.

69. The apparatus of claim 66 wherein said playing back means plays back said target image visual data as a number of playback image segments which together subtend said third field of view at said playback point.

70. The apparatus of claim 69 wherein said number of captured image segments, said number of playback image segments, and said number of display surfaces are all equal.

71. The apparatus of claim 69 wherein said number of captured image segments, said number of playback image segments, and said number of display surfaces are unequal.

72. The apparatus of claim 71 wherein any two of said number of captured image segments, said number of playback image segments, and said number of display surfaces are equal.

73. A method of serially displaying a plurality of images of a subject on a display surface having for each image a respective display surface shape and a respective display surface position, for observation from a corresponding plurality of viewpoints, one for each of said plurality of images, each of said viewpoints having a respective viewpoint position at which said display surface subtends a respective first field of view for its respective image, each of said displayed images having a controlled amount of distortion, said method comprising the steps of:

serially recording source image visual data for each of said plurality of images with respect to a respective recording point at which said subject subtends at said respective viewpoint a respective second field of view which is at least partially contained within said respective first field of view at said respective recording point;

for each of said plurality of images, transforming said respective recorded image visual data through a respective intermediate transformation process to produce respective target image visual data; and serially playing back and respective target image visual data from respective playback points each having a respective playback point position at which said display surface subtends a respective third field of view and such that said subject image subtends at said respective viewpoint a respective fourth field of view at least partially contained within said respective first field of view at said respective viewpoint, through a respective playback distorting transformation process; wherein:

for each of said plurality of images, said respective intermediate transformation process, said respective playback distorting transformation process, and said respective first, second, third and fourth fields of view combine to contribute to said controlled amount of distortion.

74. The method of claim 73 wherein said series of respective playback points in said serial playing back step comprises a single playback point used for all said plurality of images.

75. The method of claim 73 wherein said respective display surface shapes and positions comprise a single display surface shape and a single display surface position used for all of said plurality of images.

76. The method of claim 73 wherein said controlled amount of distortion is the absence of distortion.

77. The method of claim 73 wherein said playing back step comprises playing said target image visual data back on a nonplanar display surface, said nonplanar display surface contributing also to said controlled amount of distortion.

78. The method of claim 73 wherein said recording step comprises generating digital image visual data.

79. The method of claim 73 wherein said recording step comprises capturing live image visual data.

80. The method of claim 79 wherein said capturing step comprises capturing said live image visual data on a photographic medium.

81. The method of claim 79 wherein said capturing step comprises capturing said live image visual data in electronic form.

82. The method of claim 81 wherein said capturing step comprises capturing said live image visual data in a video format.

83. The method of claim 79 wherein said capturing step comprises capturing said respective image as a number of captured image segments, each of said captured image segments being captured from said respective recording point, said captured image segments together subtending said respective second field of view at said respective recording point.

84. The method of claim 73 wherein:
said respective intermediate transformation process is a respective digital transformation process; said method further comprising the step of:
digitizing said source image visual data for use in said respective digital transformation process.

85. The method of claim 73 wherein said serial recording step comprises transforming, for each respective one of said images, respective source visual data of said subject through a respective recording distorting transformation process, said respective recording distorting transformation process contributing also to said controlled amount of distortion.

86. The method of claim 85 wherein:
said respective intermediate transformation process is a respective digital transformation process; said method further comprising the step of:
digitizing said source image visual data for use in said respective digital transformation process.

87. The method of claim 86 wherein said respective digital transformation process comprises, for each target pixel of said respective target image visual data:
determining first from said respective playback distorting transformation process, said respective playback point position, said respective display surface position and said respective display surface shape, a location on said display surface onto which said target pixel would be projected;
determining second from said respective recording distorting transformation process, said respective viewpoint position, said respective display surface position and said respective display surface shape, a source pixel in said respective source image visual data which corresponds to said location on said display surface; and
filling said respective target pixel with image data from said source pixel.

88. The method of claim 87 wherein:
at least one of said first and second determining steps is performed for each respective target pixel in said respective target image visual data before said filling step is performed for any respective target pixel;
results of at least one of said first and second determining steps for each respective target pixel are used to produce a table of correspondence between source and target pixels; and
said filling step comprises, for each target pixel, looking up a respective corresponding source pixel in said table.

89. The method of claim 73 wherein said playing back step comprises playing back said respective target image visual data in electronic form.

90. The method of claim 89 wherein said playing back step comprises projecting said respective target image visual data onto said display surface in a video format.

91. The method of claim 90 wherein:
each said respective viewpoint is on a first side of said display surface; and
said projecting step comprises projecting said respective target image visual data onto said first side of said display surface.

92. The method of claim 90 wherein:
each said respective viewpoint is on a first side of said display surface; and
said projecting step comprises projecting said respective target image visual data onto a second side of said display surface opposite said first side.

93. The method of claim 73 wherein said playing back step comprises playing back said respective target image visual data photographically.

94. The method of claim 93 wherein said playing back step comprises projecting said respective target image visual data onto said display surface photographically.

95. The method of claim 94 wherein:
each said respective viewpoint is on a first side of said display surface; and
said projecting step comprises projecting said respective target image visual data onto said first side of said display surface.

96. The method of claim 94 wherein:
each said respective viewpoint is on a first side of said display surface; and
said projecting step comprises projecting said respective target image visual data onto a second side of said display surface opposite said first side.

97. The method of claim 73 wherein each said respective image is displayed on a number of display surfaces which together subtend said respective first field of view at said respective viewpoint.

98. The method of claim 97 wherein said playing back step comprises playing back said respective target image visual data as a number of playback image segments which together subtend said respective third field of view at said respective playback point.

99. The method of claim 98 wherein said number of display surfaces is equal to said number of playback image segments.

100. The method of claim 98 wherein said number of display surfaces is different from said number of playback image segments.

101. The method of claim 73 wherein said playing back step comprises playing back said respective target image visual data as a number of playback image segments which together subtend said respective third field of view at said respective playback point.

102. The method of claim 101 wherein said recording step comprises capturing said respective image as a number of captured image segments, each of said captured image segments being captured from said respective recording point, said captured image segments together subtending said respective second field of view at said respective recording point.

103. The method of claim 102 wherein said number of captured image segments is equal to said number of playback image segments.

104. The method of claim 102 wherein said number of captured image segments is different from said number of playback image segments.

105. The method of claim 73 wherein said recording step comprises capturing said respective image as a number of captured image segments, each of said captured image segments being captured from said respective recording point, said captured image segments together subtending said respective second field of view at said respective recording point.

106. The method of claim 105 wherein said respective image is displayed on a number of display surfaces which together subtend said respective first field of view at said respective viewpoint.

107. The method of claim 106 wherein said number of captured image segments is equal to said number of display surfaces.

108. The method of claim 106 wherein said number of captured image segments is different from said number of display surfaces.

109. The method of claim 106 wherein said playing back step comprises playing back said respective target image visual data as a number of playback image segments which together subtend said respective third field of view at said respective playback point.

110. The method of claim 109 wherein said number of captured image segments, said number of playback image segments, and said number of display surfaces are all equal.

111. The method of claim 109 wherein said number of captured image segments, said number of playback image segments, and said number of display surfaces are unequal.

112. The method of claim 111 wherein any two of said number of captured image segments, said number of playback image segments, and said number of display surfaces are equal.

113. Apparatus for serially displaying a plurality of images of a subject on a display surface having for each image a respective display surface shape and a respective display surface position, for observation from a corresponding plurality of viewpoints, one for each of said plurality of images, each of said viewpoints having a respective viewpoint position at which said display surface subtends a respective first field of view for its respective image, each of said displayed images having a controlled amount of distortion, said apparatus comprising:

means for serially recording source image visual data for each of said plurality of images with respect to a respective recording point at which said subject subtends a respective second field of view which is at least partially contained within said respective first field of view at said respective recording point;

intermediate transforming means for transforming said respective recorded image visual data for each of said plurality of images through a respective intermediate transformation process to produce respective target image visual data; and means for serially playing back said respective target image visual data from respective playback points each having respective playback point position at which said display surface subtends a respective third field of view and such that said subject image subtends at said respective viewpoint a respective fourth field of view at least partially contained within said respective first field of view at said respective viewpoint, through a respective playback distorting transformation process; wherein:

for each of said plurality of images, said respective intermediate transformation process, said respective playback distorting transformation process, and said respective first, second, third and fourth fields of view combine to contribute to said controlled amount of distortion.

114. The apparatus of claim 113 wherein said serial playing back means plays back all of said plurality of images from a single playback point.

115. The apparatus of claim 113 wherein said respective display surface shapes and positions comprise a single display surface shape and single display surface position used for all of said plurality of images.

116. The apparatus of claim 113 wherein said controlled amount of distortion is the absence of distortion.

117. The apparatus of claim 113 wherein said playing back means plays said target image visual data back on a nonplanar display surface, said nonplanar display surface contributing also to said controlled amount of distortion.

118. The apparatus of claim 113 wherein said recording means comprises means for generating digital image visual data.

119. The apparatus of claim 113 wherein said recording means comprises means for capturing live image visual data.

120. The apparatus of claim 119 wherein said capturing means captures said live image visual data on a photographic medium.

121. The apparatus of claim 119 wherein said capturing means captures said live image visual data on electronic form.

122. The apparatus of claim 121 wherein said capturing means captures said live image visual data in a video format.

123. The apparatus of claim 119 wherein said capturing means captures said respective image as a number of captured image segments, each of said respective captured image segments being captured from said respective recording point, said captured image segments together subtending said respective second field of view at said respective recording point.

124. The apparatus of claim 113 wherein:

said intermediate transforming means comprises digital transforming means; said apparatus further comprising:
means for digitizing said source image visual data for use in said respective digital transforming means.

125. The apparatus of claim 113 wherein said serial recording means transforms, for each respective one of said images, respective source visual data of said subject through a respective recording distorting transformation process, said respective recording distorting transformation contributing also to said controlled amount of distortion.

126. The apparatus of claim 125 wherein:
said intermediate transforming means comprises digital transforming means; said apparatus further comprising:
means for digitizing said source image visual data for use in said respective digital transforming means.

127. The apparatus of claim 126 wherein said digital transforming means comprises, for each target pixel of said respective target image visual data:
first determining means for determining from said respective playback distorting transformation process, said respective playback point position, said respective display surface position and said respective display surface shape, a location on said display surface onto which said target pixel would be projected;
second determining means for determining from said respective recording distorting transformation process, said respective viewpoint position, said respective display surface position and said respective display surface shape, a source pixel in said respective source image visual data which corresponds to said location on said display surface; and
means for filling said respective target pixel with image data from said source pixel.

128. The apparatus of claim 127 wherein:
at least one of said first and second determining means operates on each respective target pixel in said respective target image visual data before said filling means operates on any respective target pixel;
output of at least one of said first and second determining means for each respective target pixel is used to produce a table of correspondence between source and target pixels; and
for each respective target pixel, said filling means looks up a respective corresponding source pixel in said table.

129. The apparatus of claim 113 wherein said playing back means plays back said respective target image visual data in electronic form.

130. The apparatus of claim 129 wherein said playing back means projects said respective target image visual data onto said display surface in a video format.

131. The apparatus of claim 130 wherein:
each said respective viewpoint is on a first side of said display surface; and
said projecting means projects said respective target image visual data onto said first side of said display surface.

132. The apparatus of claim 130 wherein:
each said respective viewpoint is on a first side of said display surface; and
said projecting means projects said respective target image visual data onto a second side of said display surface opposite said first side.

133. The apparatus of claim 113 wherein said playing back means plays back said respective target image visual data photographically.

134. The apparatus of claim 133 wherein said playing back means projects said respective target image visual data onto said display surface photographically.

135. The apparatus of claim 134 wherein:
each said respective viewpoint is on a first side of said display surface; and
said projecting means projects said respective target image visual data onto said first side of said display surface.

136. The apparatus of claim 134 wherein:
each said respective viewpoint is on a first side of said display surface; and
said projecting means projects said respective target image visual data onto a second side of said display surface opposite said first side.

137. The apparatus of claim 113 wherein each said respective image is displayed on a number of display surfaces which together subtend said respective first field of view at said respective viewpoint.

138. The apparatus of claim 137 wherein said playing back means plays back said respective target image visual data as a number of playback image segments which together subtend said respective third field of view at said respective playback point.

139. The apparatus of claim 138 wherein said number of display surfaces is equal to said number of playback image segments.

140. The apparatus of claim 138 wherein said number of display surfaces is different from said number of playback image segments.

141. The apparatus of claim 113 wherein said playing back means plays back said respective target image visual data as a number of playback image segments which together subtend said respective third field of view at said respective playback point.

142. The apparatus of claim 141 wherein said recording means captures said respective image as a number of captured image segments, each of said captured image segments being captured from said respective recording point, said captured image segments together subtending said respective second field of view at said respective recording point.

143. The apparatus of claim 142 wherein said number of captured image segments is equal to said number of playback image segments.

144. The apparatus of claim 142 wherein said number of captured image segments is different from said number of playback image segments.

145. The apparatus of claim 113 wherein said recording means captures said respective image as a number of captured image segments, each of said captured image segments being captured from said respective recording point, said captured image segments together subtending said respective second field of view at said respective recording point.

146. The apparatus of claim 145 wherein said respective image is displayed on a number of display surfaces which together subtend said respective first field of view at said respective viewpoint.

147. The apparatus of claim 146 wherein said number of captured image segments is equal to said number of display surfaces.

148. The apparatus of claim 146 wherein said number of captured image segments is different from said number of display surfaces.

149. The apparatus of claim 146 wherein said playing back means plays back said respective target image visual data as a number of playback image segments which together subtend said respective third field of view at said respective playback point.

150. The apparatus of claim 149 wherein said number of captured image segments, said number of playback image segments, and said number of display surfaces are all equal.

151. The apparatus of claim 149 wherein said number of captured image segments, said number of playback image segments, and said number of display surfaces are unequal.

152. The apparatus of claim 151 wherein any two of said number of captured image segments, said number of playback image segments, and said number of display surfaces are equal.

* * * * *

UNITED STATES PATENT AND TRADEMARK OFFICE
CERTIFICATE OF CORRECTION

PATENT NO. : 5,329,310
DATED     : July 12, 1994
INVENTOR(S) : Gordon E. Liljegren et al.

It is certified that error appears in the above-identified patent and that said Letters Patent is hereby corrected as shown below:

Column 5, line 68, "IRIS-4D TM Indigo TM" should be -- IRIS-4D™ Indigo™ --.

Column 6, line 9, "11"" should be -- 11", --;
         line 16, "17"" should be -- 17", --.

Claim 48, column 13, line 14, "look" should be -- looks --.

Claim 121, column 18, line 56, "on" should be -- in --.

Signed and Sealed this

Twenty-eight Day of March, 1995

Attest:

BRUCE LEHMAN

Attesting Officer    Commissioner of Patents and Trademarks